W. F. LAWLOR.
SAW GUARD.
APPLICATION FILED SEPT. 18, 1914.
1,152,325.
Patented Aug. 31, 1915.
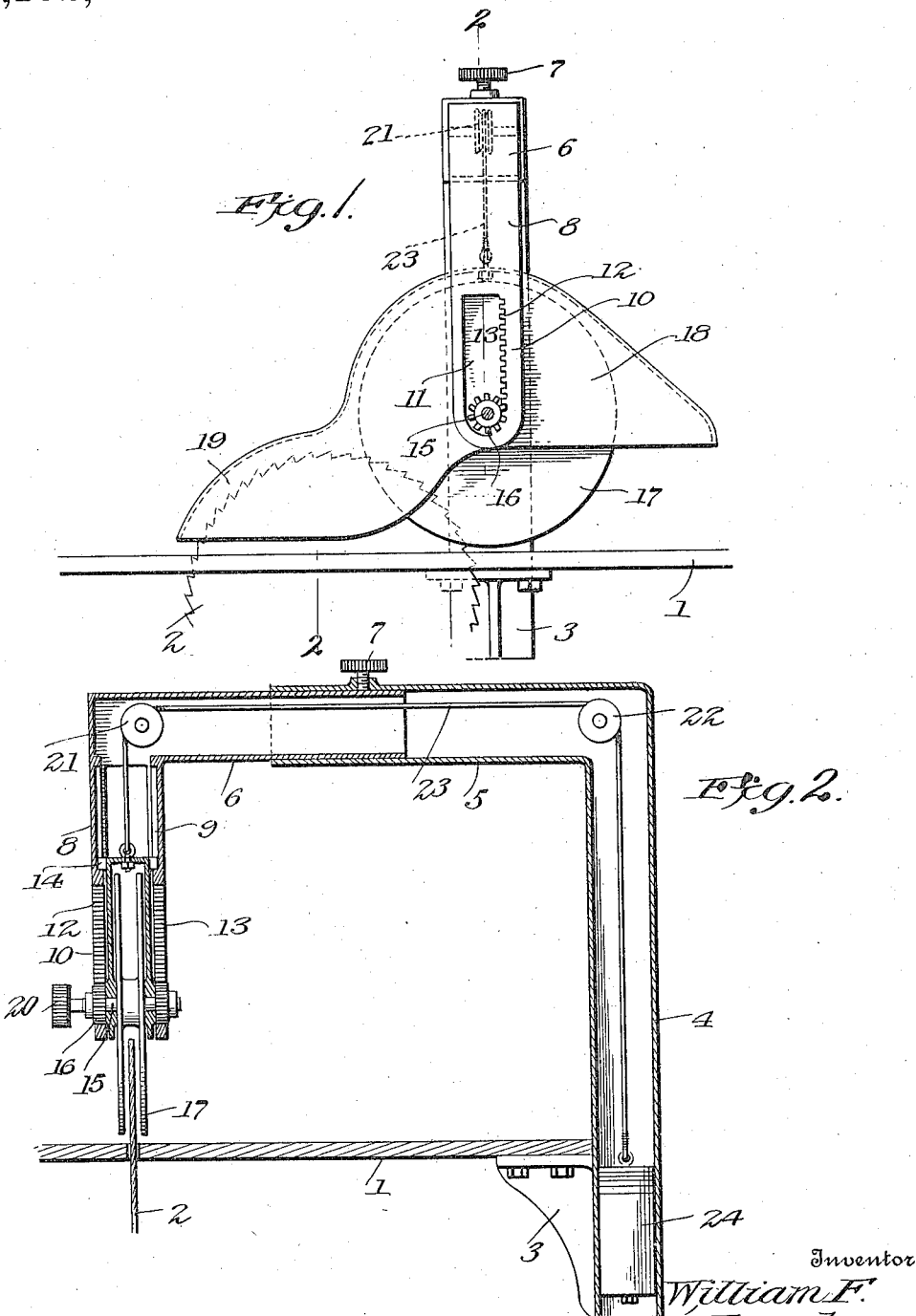
Witnesses
F.W. Ackman Jr.
N. Peacock
Inventor
William F. Lawlor,
By Victor J. Evans
Attorney

UNITED STATES PATENT OFFICE.

WILLIAM F. LAWLOR, OF PORT CHESTER, NEW YORK.

SAW-GUARD.

1,152,325.     Specification of Letters Patent.     Patented Aug. 31, 1915.

Application filed September 18, 1914. Serial No. 862,387.

*To all whom it may concern:*

Be it known that I, WILLIAM F. LAWLOR, a citizen of the United States of America, residing at Port Chester, in the county of Westchester and State of New York, have invented new and useful Improvements in Saw-Guards, of which the following is a specification.

This invention relates to saw guards and it consists in the novel features hereinafter described and claimed.

An object of the invention is to provide a guard especially adapted to be used in combination with circular saws the said guard being provided with means for effectually holding a board upon the table of the saw when the board is presented to the saw, the guard also being adapted to prevent the saw from throwing material toward the receiving edge of the table.

A further object of the invention is to provide in combination with a saw guard of the character indicated means adapted to serve as a clamp or barrier for preventing retrograde movement of the board or the strip which is cut therefrom by the saw during the sawing operation.

Another object of the invention is to provide means for counterbalancing the guard in order that the same may operate freely in performing its various functions.

In the accompanying drawing: Figure 1 is a side elevation of the guard showing the same applied to a saw table. Fig. 2 is a transverse sectional view of the guard cut on the line 2—2 of Fig. 1.

As illustrated in the accompanying drawing the table of the saw is indicated at 1 and the circular saw is indicated at 2. A bracket 3 is secured in any suitable manner to one edge portion of the table 1 and a hollow standard 4 is carried by the said bracket 3. The standard 4 is provided at its upper end with an angular extension 5 which is disposed approximately parallel with the upper surface of the table 1. A hollow arm 6 is inserted in the end of the extension 5 and may be secured at an adjusted position therein by means of a set screw 7 provided on the extension 5 of the standard 4. The arm 6 is provided at its end with a downwardly disposed hollow extension 8 having at its inner sides vertically disposed grooves 9. Side plates 10 depend from the lower end of the extension 8 and the said plates are provided with vertically disposed slots 11 having at their forward edges teeth 12.

A frame 13 is slidably mounted in the extension 8 and between the side plates 10, and the said frame is provided at its upper end with lugs 14 which are slidably received in the grooves 9. A shaft 15 is journaled in the lower portion of the frame 13 between the opposite sides thereof and pinions 16 are fixed to the said shaft and are located in the slots 11 and mesh with the teeth 12 at the edges of the said slots. Spaced disks 17 are mounted upon the shaft 15 and are located at the opposite sides of the upper portion of the saw 2 and extend in advance of the said saw as best shown in Fig. 1 of the drawing. The lower edges of the disk 17 are spaced from the upper surface of the table 1 but normally remain in close proximity thereto. The frame 13 carries a hood portion 18 which extends over the upper forward portions of the disks 17 and the said frame also carries a hood portion 19 which extends back over the upper portion of the saw 2. A knob 20 is fixed to the shaft 15 and may be used for manually turning the said shaft and the parts mounted thereon. A pulley 21 is journaled for rotation in the arm 6 above the extension 8 thereof and a pulley 22 is journaled for rotation at the upper end of the standard 4. A cable 23 is trained over the pulleys 21 and 22 and one end of the said cable is connected with the upper end of the frame 13 while the other end of the said cable extends down into the standard 4 and is connected with a weight 24 which is slidably received in the said standard 4.

From the above description taken in conjunction with the accompanying drawing it will be observed that when a board is placed upon the table 1 and is moved toward the saw 2 the lower edges of the disks 17 will first encounter the upper surface of the said board and the said disks 17 will be elevated slightly with relation to the table 1. When the board encounters the saw 2 the saw cuts a strip from the same and one of the disks rest upon the strip while the other disk 17 rests upon the board. Inasmuch as the teeth 12 are mounted at one edge only of the slots 11 the pins 16 are free to rotate so that the shaft 15 may move in an upward direction, when the lower portions of the disks 17 turn toward the center of the saw 3. However if an attempt is made to withdraw the board or the strip from the saw, that is to say if either the strip or the board is given a retrograde movement there will be a tendency to turn the disks 17 in an opposite direction whereby the teeth of the pinions 16 engaging within the teeth 12 will have a tendency to move the shaft 15 in a downward direction and consequently the said board and the strip are clamped and held against retrograde movement with relation to the saw. Furthermore the hood 19 and 18 will prevent the saw from throwing material in an upward direction toward an operator who may be standing at the receiving edge of the table 1. Therefore it will be seen that a simple and effective saw guard is provided for a circular saw and that the parts mutually coöperate with each other to facilitate the advancement of material toward the saw but prevent retrograde movement on the part of the material during the sawing operation.

Having described the invention what is claimed is:—

In combination with a saw, a guard comprising a frame mounted for vertical movement with relation to the saw, plates located at the opposite sides of the frame and provided with slots having teeth at one edge a shaft journaled in the frame, pinions carried by the shaft and meshing with the teeth, and spaced disks mounted upon the shaft and disposed at the opposite sides of the saw.

In testimony whereof I affix my signature in presence of two witnesses.

WILLIAM F. LAWLOR.

Witnesses:
RASMUS REIS,
EVA PARKER FERRIS.

Copies of this patent may be obtained for five cents each, by addressing the "Commissioner of Patents, Washington, D. C."